United States Patent [19]

Takahashi

[11] 4,380,309
[45] Apr. 19, 1983

[54] DEVELOPER SUPPLY DEVICE
[75] Inventor: Yuji Takahashi, Tokyo, Japan
[73] Assignee: Canon Kabushiki Kaisha, Tokyo, Japan
[21] Appl. No.: 225,342
[22] Filed: Jan. 15, 1981
[30] Foreign Application Priority Data Jan. 21, 1980 [JP] Japan .................................. 55-5424

[51] Int. Cl.³ ............................................ G01F 11/28
[52] U.S. Cl. ................................ 222/450; 222/DIG. 1
[58] Field of Search .................... 430/31; 222/DIG. 1, 222/129.3, 145, 450, 425

[56] References Cited
U.S. PATENT DOCUMENTS 3,026,406 3/1962 Van Den Blink .............. 222/450 X
3,999,687 12/1976 Baer ............................... 222/DIG. 1

FOREIGN PATENT DOCUMENTS 54-48254 4/1979 Japan .

*Primary Examiner*—Stanley H. Tollberg
*Attorney, Agent, or Firm*—Fitzpatrick, Cella, Harper & Scinto

[57] ABSTRACT

A developer supply device for supplying developing apparatus with a developer consisting of a mixture of toner and carrier, is characterized in that when toner and carrier are supplied separately to the developing apparatus, a magnetic field is provided near a carrier storage device storing carrier therein and the supply of the carrier is controlled by the magnetic field.

15 Claims, 10 Drawing Figures

DEVELOPER SUPPLY DEVICE

BACKGROUND OF THE INVENTION

1. Field of the Invention

This invention relates to a developer supply device for maintaining constant the developing effect of a two-component developer for image formation apparatus which consists of a mixture of toner and carrier.

2. Description of the Prior Art

Generally, in an image formation apparatus for forming an image by a magnetic latent image or an electrostatic latent image, use is made of a two-component developer consisting of a mixture of toner and carrier. It is well known that the weight admixture ratio of toner and carrier in such developer is a very important factor from the viewpoint of the developing effect. For example, when the proportion of toner to carrier (hereinafter simply referred to as the toner density) is low, namely, when the density of the toner in the developer is low, the density of the image after developed becomes thin. Conversely, when the proportion of toner is too high, the density of the developed image becomes too thick and also fog is increased. Accordingly, in order that images of preferable color tone may be continuously obtained, it is necessary to render the density of the toner in the developer into a proper level and moreover to maintain the level constant always during development.

However, in the conventional developer supply devices, although the developer dealt with therein has been a two-component developer, the developer supplied as a replenishing agent has been toner alone or a developer consisting of toner and carrier mixed therewith at a very small proportion, and the conventional developer supply devices have not been such that supply of carrier is effected separately from the supply of toner. Accordingly, there has been adopted a method whereby toner alone or toner with a small amount of carrier mixed therewith is supplied to compensate for the reduction in toner density which takes place in accordance with toner consumption, and this has led to a disadvantage that even if the toner density can be maintained substantially constant, the amount of the developer (mixture of toner and carrier) within the developing device varies. Also, in the conventional developer supply devices, the supply of carrier is not independently effected and therefore, when toner alone is supplied, a variation in volume of the developer has resulted from the consumption of carrier (actually, carrier is also consumed little by little as will later be described), and in the case of the supply of toner with carrier mixed therewith, there has been a disadvantage that if a balance with the consumed carrier is not kept, a variation in volume of the developer may also occur.

Such a variation in volume of the developer within the developing device cannot be visually confirmed because the developing device is usually mounted deep in the dark interior of an electrophotographic apparatus body and heretofore, it has been as much as one can do to judge such variation by referring to the density of the image on the resultant copy paper or to detect it only when the developer has become less than a predetermined amount. Accordingly, the fact that any change for increase or decrease in amount of the developer from a preferable amount cannot be known has necessarily resulted in adverse effects such as instability of image density attributable to the variation in amount of the developer, increased fog, reduced sharpness of the image portion, irregularity of development, etc., and has also adversely affected the stirring and conveyance of the developer.

Therefore, the assignee of the present invention has proposed, in Japanese Laid-open Patent Application No. 48254/1979, a developer supply device which supplies toner and carrier separately. The present invention intends to improve the carrier supply method in such a developer supply device.

SUMMARY OF THE INVENTION

It is an object of the present invention to provide a developer supply device which is capable of maintaining the density of developer at a proper level.

It is another object of the present invention to provide a developer supply device which effects the control of the supply of carrier to a developing device.

It is still another object of the present invention to provide a developer supply device which controls the supply of carrier by the intensity or presence of a magnetic field.

It is yet still another object of the present invention to provide a developer supply device which controls the supply of magnetic toner by the intensity or presence of a magnetic field.

It is a further object of the present invention to provide a developer supply device which enables the supply of developer to be confirmed.

The present invention consists in a developer supply device having storage means for storing developer therein, magnetic field forming means provided near the supply portion of the developer storage means, and means for controlling the intensity of a magnetic field imparted to the developer supply portion by the magnetic field forming means, the intensity of the magnetic field being varied by the control means so that the passage and the regulation of the passage of the developer in the supply portion are controlled.

The above and other objects and features of the present invention will becomes more fully apparent from the following detailed description taken in conjunction with the accompanying drawings.

DESCRIPTION OF THE PREFERRED EMBODIMENTS

An embodiment of the present invention will hereinafter be described in detail with reference to the drawings.

Figure 1:
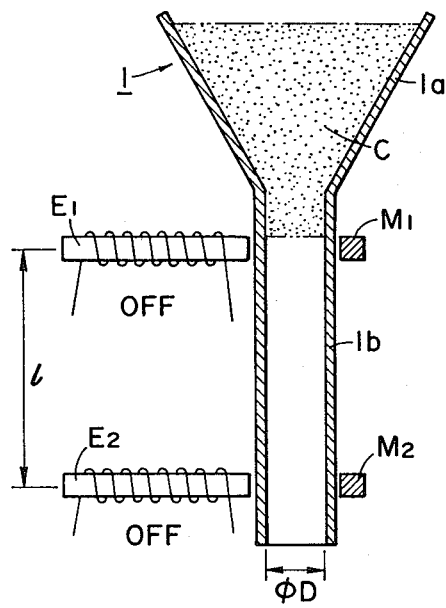
FIGS. 1, 2 and 3 are side views of a carrier supply device showing an embodiment of the present invention for controlling and supplying carrier to developing means.
Figure 2:
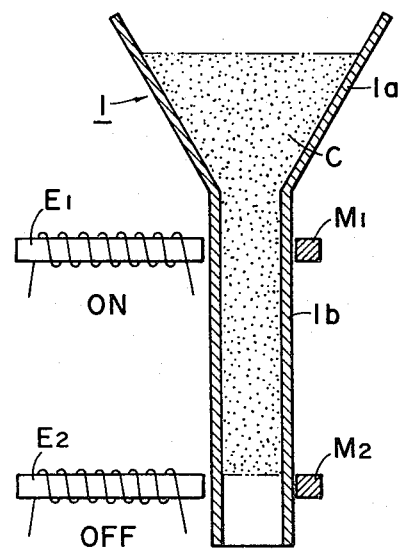
Figure 3:
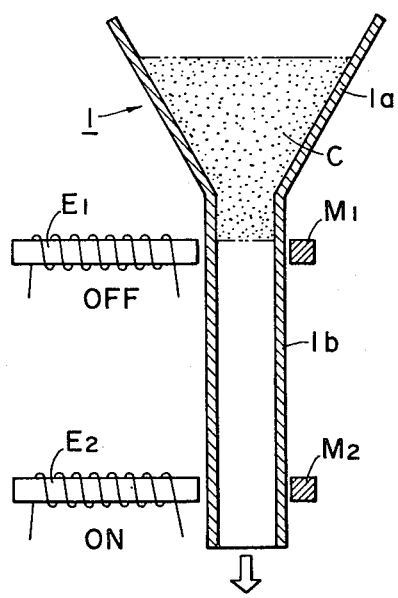

Reference is first had to FIGS. 1 to 3 to describe an embodiment of the carrier supply means of the present invention for controlling and supplying carrier to developing means from a hopper storing carrier therein. This embodiment utilizes the fact that the carrier is made of iron powder. In these Figures, reference numeral 1 designates storage means or a hopper for storing carrier therein. This hopper assumes a funnel shape comprising a conical portion 1a and a vertical tubular portion 1b which is a supply portion extending downwardly from the conical portion 1a. Electromagnets E1 and E2 are provided adjacent to the vertical tubular portion 1b and spaced apart a distance 1 from each other. Permanent magnets M1 and M2 are provided in opposed relationship with the electromagnets E1 and E2, respectively, with the vertical tubular portion 1b interposed therebetween. The electromagnets E1 and E2 are connected to a power source (not shown) and produce or extinguish magnetic fields upon ON or OFF of the current. Wnen, as shown in FIG. 1, there is no current flowing to the electromagnets E1 and E2 and both of them are in OFF condition, no magnetic field is produced from these electromagnets E1 and E2. Consequently, the carrier C in the hopper does not fall through the hopper 1 because the iron powders are magnetized by the magnetic field of the magnet M1 and attract each other. In this case, the electromagnet E2 may be in ON condition.

Next, when current to the electromagnet E1 in ON and the current to the electromagnet E2 is OFF as shown in FIG. 2, the magnetic field of the permanent magnet M1 is negated by the magnetic field of the electromagnet E1 and the carrier C is liberated from the restraining force of the magnetic field of the permanent magnet M1 to fall through the hopper 1, and then is caught by the magnetic field of the permanent magnet M2 so that the fall of the carrier is stopped there.

Further, by rendering the current to the electromagnet E1 OFF and rendering the current to the electromagnet E2 ON as shown in FIG. 3, the fall of the carrier C from the upper portion of the hopper 1 is again stopped by the magnetic field of the permanent magnet M1 while the magnetic field of the permanent magnet M2 is negated by the electromagnet E2 and therefore, after all, the carrier between the permanent magnets M1 and M2 falls through the hopper 1.

By doing so, the fall of a predetermined amount of carrier C determined by the inside diameter $\phi D$ of the vertical tubular portion 1b and the distance 1 becomes possible and this predetermined amount of carrier C is supplied to developing means. Accordingly, by suitably varying the inside diameter $\phi D$ and the distance 1, the amount of carrier supplied during one supply cycle can be varied.

Of course, if the currents to the electromagnets E1 and E2 are rendered ON simultaneously, an amount of fall of carrier corresponding to the time during which the currents are ON will be obtained. Where the amount of fall of carrier is so controlled by time, only one of the electromagnets E1 and E2 may be disposed and ON-OFF-controlled.

In the above-described embodiment, permanent magnets are disposed in opposed relationship with the electromagnets, but it is also possible to control the fall of the carrier only by the electromagnets without the permanent magnets. In such case, the fall of the carrier will be stopped by ON of the electromagnets and the fall of the carrier will be permitted upon OFF of the electromagnets. In this case, however, when the current supply to the electromagnets becomes null, the carrier will fall and therefore, even when image formation is not taking place, it is necessary that current be supplied to the electromagnets or the fall of the developer be stopped by using a shield plate or the like in the vertical tubular portion 1b.

Another embodiment of the present invention will be described with reference to FIG. 4. In this embodiment, the supply of carrier C is controlled by moving permanent magnets toward or away from the vertical tubular portion 1b of the hopper 1.

Figure 4:
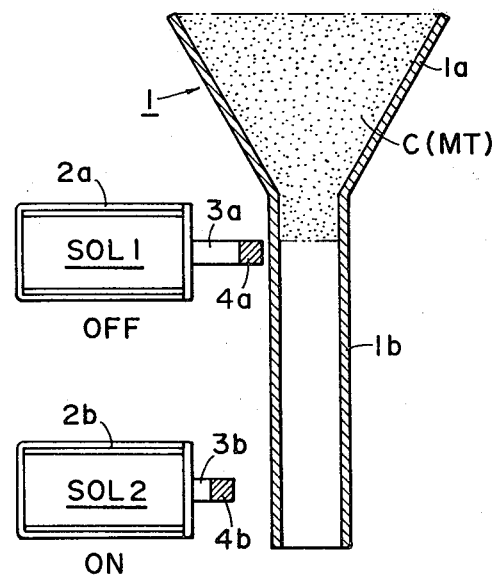
FIG. 4 is a side view showing another embodiment of the present invention.

In FIG. 4, reference characters 2a and 2b designate solenoids, and permanent magnets 4a and 4b are attached to the ends of the plungers 3a and 3b of the solenoids 2a and 2b. When there is no current flowing to the solenoid 2a, the permanent magnet 4a is moved toward the vertical tubular portion 1b by the resilient force of a spring (not shown) acting on the plunger 3a and the magnetic field thereof stops the fall of the carrier C. By a current being supplied to the solenoid, for example, as indicated at the solenoid 2b, the plunger 3b is attracted against the spring force and the permanent magnet 4b is moved away from the vertical tubular portion 1b so that the magnetic field thereof does not reach the carrier C. Thus, the carrier C falls through the vertical tubular portion 1b and is supplied to the developing means. By time-controlling the movement of the permanent magnets 4a and 4b toward and away from the hopper 1 as in the embodiment of FIGS. 1 to 3, it is possible to supply a predetermined amount of carrier to the developing means. Where the amount of fall of carrier is controlled by time, one of the permanent magnets 4a and 4b may be disposed and time-controlling as in the previous embodiment.

The decrease of the carrier gradually progresses little by little and therefore, supply of carrier need not be effected so frequently, but it is usually desirable to supply carrier when image formation on 100,000 to 150,000 sheets of A4 size recording paper has been done. Accordingly, when the number of sheets of recording paper has reached a prescribed number by counting, the electromagnets or solenoids may be controlled in the manner previously described. Alternaively, any variation in proportion of the toner and carrier in the developer or any variation in volume of the developer within the developing device may be detected so that the supply of carrier is controlled by the detection signal. The control of these electromagnets or solenoids may be effected by the use of a well-known time control circuit. Alternatively, the control may be effected by the use of a centrol processing unit as will later be described.

Also, in an apparatus using a magnetic toner having no carrier, the supply control entirely similar to the above may be effected by utilizing the fact that the magnetic toner is magnetic powder like the carrier. In this case, magnetic toner MT will be used instead of the carrier C of FIGS. 1 to 4.

Figure 5:
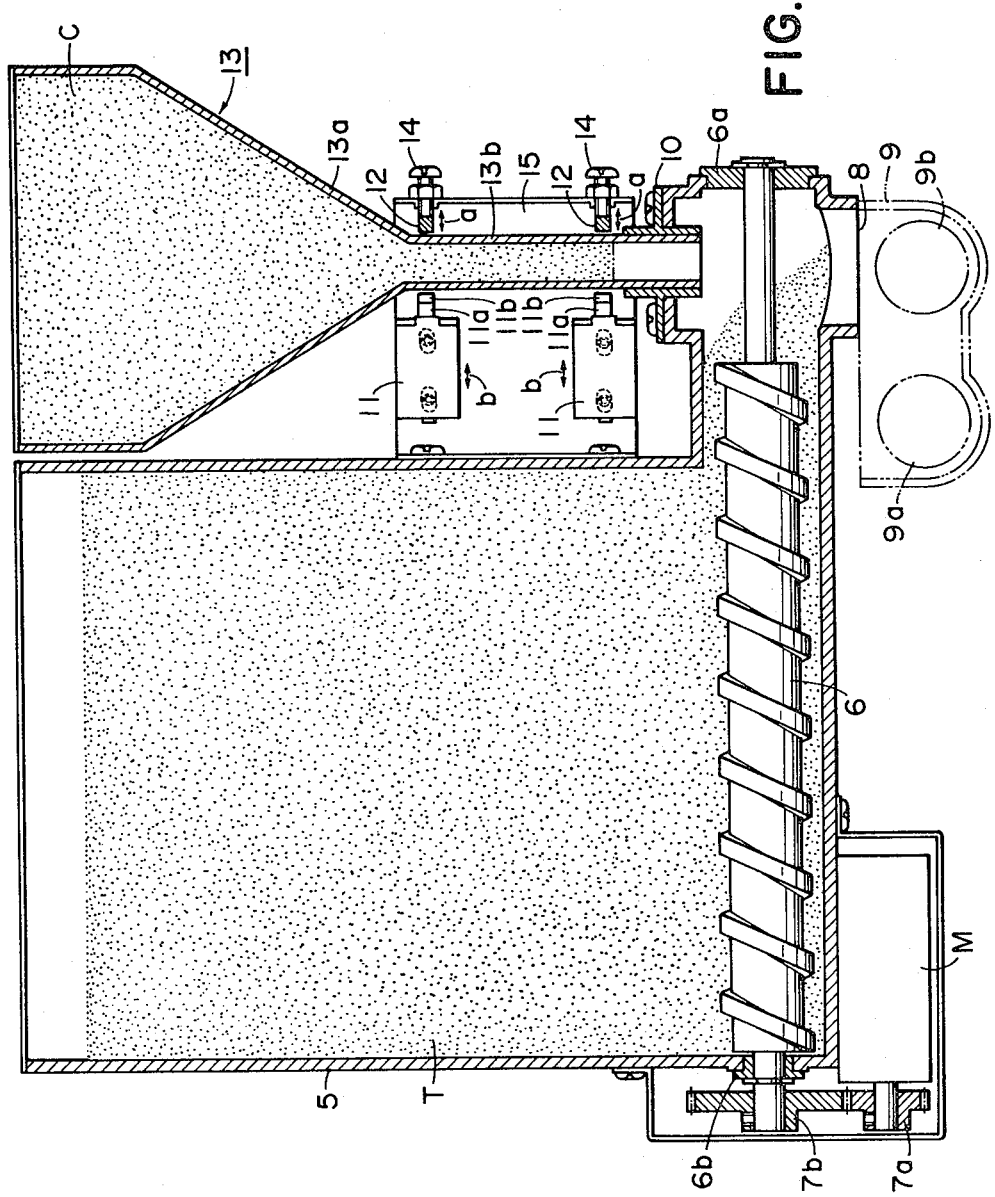
FIG. 5 is a side view showing an embodiment of the developer supply device according to the present invention.

Further, FIG. 5 shows an embodiment in which the above-described carrier storage means is applied to a developing device as the developer supply device. In this embodiment, a screw 6 is provided in the lower portion of a storage device 5 storing toner T therein. This screw 6 is provided through bearings 6a and 6b and is rotated by the rotation of a motor M being transmitted thereto be gears 7a and 7b, and supplies the toner T within the toner storage device 5 into developing means 9 through a supply port 8.

A hopper 13 made of a transparent material such as glass or acryl for storing carrier C therein is provided in juxtaposed relationship with the toner storage device 5.

Below the conical portion 13a of the hopper, a vertical tubular portion 13b is provided in opposed relationship with the supply port 8 with a mounting flange 10 interposed therebetween. Designated by 11 are solenoids, and permanent magnets 11b are attached to the ends of the plungers 11a thereof which are movable in the direction of arrow b. Permanent magnets 12 are provided on a mounting plate 15 in opposed relationship with the solenoids 11 with the supply portion 13b interposed therebetween. Each of these permanent magnets 12 is movable in the direction of arrow a by an adjust screw 14 to adjust the distance to the supply portion 13b and adjust the intensity of the magnetic field acting on the carrier C. The permanent magnets M1 and M2 shown in FIGS. 1 to 3 can also be made adjustable.

Thus, by switching on and off the current supply to the solenoids 11 as previously described, a predetermined amount of carrier can be supplied to the developing means through the supply port 8. Coupled therewith, the toner within the storage device 5 can be supplied to the developing means by the rotation of the screw 6 also through the supply port 8. In this case, the supply of the toner to the developing means can be controlled by controlling the rotation of the screw 6.

Now, in this embodiment, when an experiment was carried out with about 1000–2000 [gauss] as the magnetic flux density of the permanent magnets 12 and about 300–400 [gauss] as the magnetic flux density of the permanent magnets 11b, reliable control of the supply of the carrier to the developing means could be accomplished.

In the present embodiment, toner T and carrier C can be supplied to the developing means through the same supply port 8 and therefore, toner T and carrier C can be mixed with each other efficiently. Also, the toner and carrier can be supplied to the developing means while being individually controlled and therefore, the weight admixture proportion of toner and carrier can be maintained substantially constant to enable developed images of good quality to be obtained. Further, the hopper being formed of a transparent material enables the amount of carrier remaining therein to be confirmed from outside.

Designated by 9a and 9b are screws provided within the developing means to convey the toner T and carrier C supplied from the supply port 8 into the interior of the developing means.

The developer supply device constructed as described above is applicable to any image formation apparatus such as a copying machine or the like, and particularly suited for an apparatus for effecting image formation at high speed and in great quality. The present invention is best suited for laser beam printers which effect image formation by the use of a laser beam. Usually, in a laser beam printer, image formation on average 1,000.000 sheets of A4 size recording paper is carried out in every month and in such a printer, not only the toner consumption is great but also the decrease of carrier is remarkable. Accordingly, if the developer supply device of the present invention is applied to a laser beam printer, it will ensure obtainment of clean images free of density irregularity and fog.

Now, if the hopper for carrier is formed of a transparent material, the amount of carrier remaining therein and the presence of carrier therein can be visually confirmed, but since the hopper is usually mounted in the interior of an image formation apparatus, the confirmation must be made by opening the apparatus each time and the operation involved becomes cumbersome. To solve this problem, according to the present invention, provision is made of detector means for detecting the presence of carrier or toner.

That is, according to the present invention, in a device for controlling the supply of carrier by the control of magnetic field forming means, there is provided carrier detecting means adjacent to the magnetic field forming means. If, by examining the output from such detecting means, the absence of carrier is detected at the time the carrier must be present, it can be confirmed whether the carrier has been exhausted or clogging has been caused in the supply path. On the other hand, if the presence of carrier is detected at the time the carrier must not be present, it indicates that an amount of carrier more than necessary has been supplied and that abnormality has occurred to the apparatus. By so providing a sensor in the supply control portion of the carrier supply means and examining the output signal of the sensor at suitable times, it is possible to exactly grasp the condition of the supply means.

Figure 6:
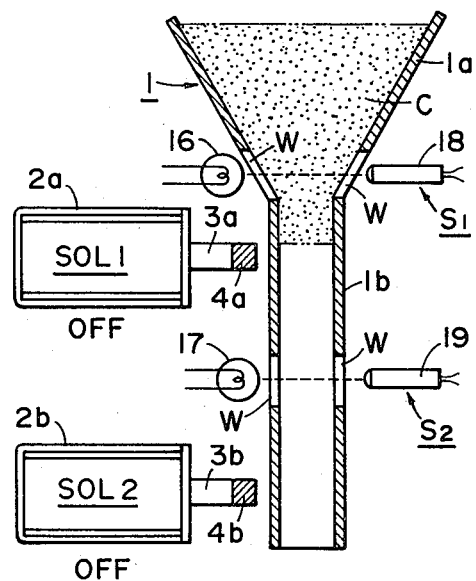
FIGS. 6, 7 and 8 are side views of a carrier supply device having detector means.
Figures 7, 8:
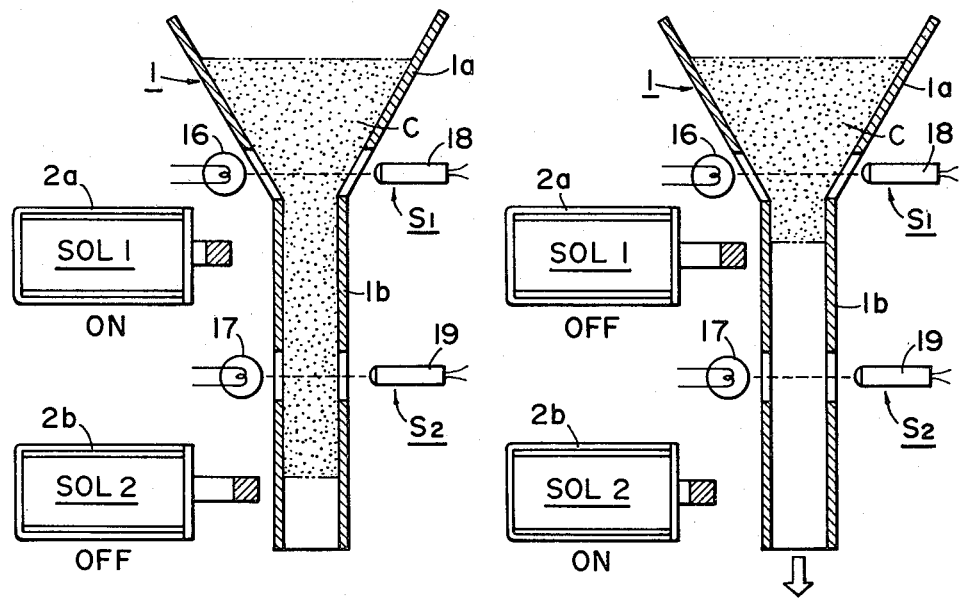

Reference is now had to FIGS. 6 to 8 to describe an embodiment in which detector means is provided in the supply means for controlling and suppling carrier to the developing means from a hopper storing carrier therein. The embodiment of FIGS. 6 to 8 is one applied to a device using the control method shown in FIG. 4, and similar members are given similar reference characters.

In FIG. 6, both of SOL1 and SOL2 are in OFF condition and the carrier within the hopper is restrained from falling by the magnetic field of a permanent magnet 4a. Next, when SOL1 is energized, the permanent magnet is moved away from the hopper and thus, the carrier falls from gravity, but the permanent magnet 4b of SOL2 remains proximate to an outlet portion 1b and therefore, the falling of the carrier is prevented by the magnetic field of this magnet. Next, when SOL1 is deenergized and SOL2 is energized, a predetermined amount of carrier present between SOL1 and SOL2 falls. On the other hand, the carrier within the upper portion of the hopper is prevented from falling by the magnetic field of the magnet attached to the end of SOL1.

Now, a pair of photosensors are respectively disposed adjacent to the carrier storage portion and between SOL1 and SOL2 in the vertical tubular portion 1b, and the sensor above SOL1 is designated by S1 and the sensor between SOL1 and SOL2 is designated by S2. The photosensors S1 and S2 comprise a pair of lamps 16, 17 and a pair of light-receiving elements 18, 19. The hopper 1 may be formed of a transparent material such as glass or acryl, or as shown, windows W of a transparent material may be provided only in the portions of the hopper corresponding to the light paths of the photosensors.

In FIGS. 6 to 8, the output when the sensor portions are obstructed by the carrier is defined as ON. In these Figures, the output from S1 is always ON. However, when the level of the carrier is reduced and the light from the lamp reaches the light-receiving element, the output of the sensor S1 becomes OFF.

On the other hand, in FIG. 6, the output of the sensor S2 is OFF because there is no carrier in the sensor portion. In FIG. 7, the carrier falls to the vertical tubular portion 1b and therefore, the light from the lamp 17 is intercepted and the output from the sensor S2 is ON. In FIG. 8, the carrier has fallen from the vertical tubular portion 1b and therefore, the output of the sensor S2 again becomes OFF.

Figure 9:
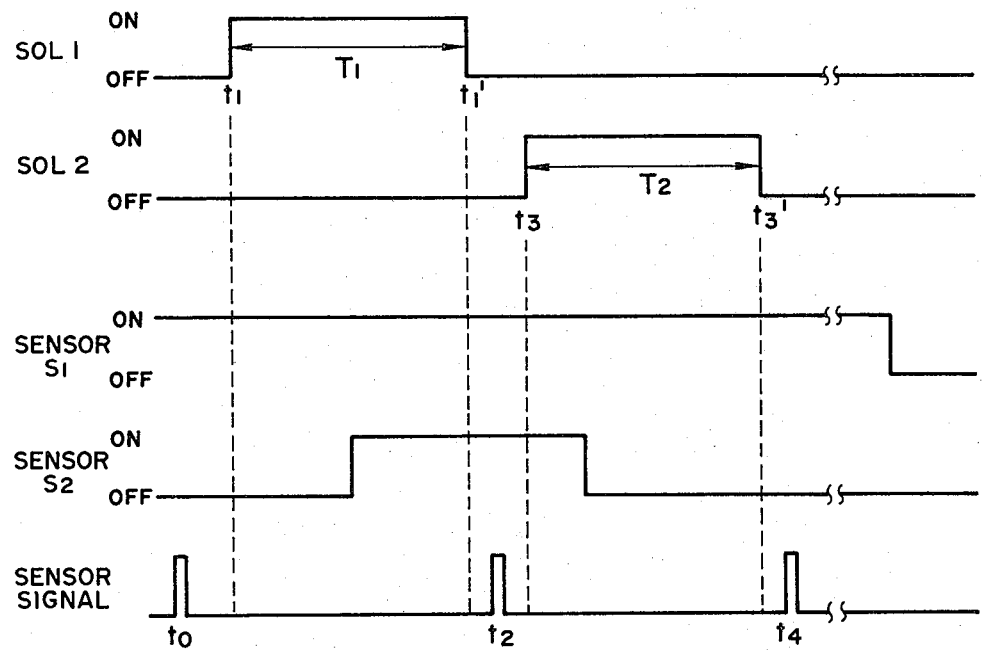
FIG. 9 is a timing chart showing the timing relation between sensors and solenoids.

The above-described states are shown in the timing chart of FIG. 9. Let the energization time of SOL1 be T1 and the energization time of SOL2 be T2. On the time axis, the energization timings of SOL1 and SOL2 are effected at times $t_1$ and $t_3$, respectively. Thereupon, the feeding of the carrier is effected by the energization of SOL1 and SOL2 and the outputs of the sensors S1 and S2 assume the forms as shown. On the other hand, to examine whether or not the carrier has been properly fed, a sense signal may be produced from a central processing unit (CPU) and ON/OFF of said sensor output may be examined. That is, the outputs of the sensors S1 and S2 are checked up at timing $t_0$ earlier than the timing $t_1$ whereat SOL1 is energized. Next, at timing $t_2$ after the timing $t_1'$ whereat the energization of SOL1 has been completed and before the timing $t_3$ whereat SOL2 is energized, namely, at time which is $t_1' < t_2 < t_3$, the output of the sensor S2 is checked up. Further, at timing after the timing $t_3'$ whereat the energization of SOL2 has been completed, namely, at time which is $t_3' < t_4$, the output of the sensor S2 is checked up. The output of the sensors S1 and S2 sensed in this manner at the timings $t_0$, $t_2$ and $t_4$ are arranged into a table, from which judgment of the state is effected. This table is shown in Table 1 below. In Table 1, the time when the sensor output is ON, namely, when carrier is present in the sensor portion, is represented as 1, and the time when the sensor output is OFF, namely, when carrier is not present in the sensor portion, is represented as 0.

TABLE 1

| 0 | 0 | 0 | 0 | Carrier absent (empty) |
|---|---|---|---|---|
| 1 | 0 | 1 | 0 | Supply completed normally |
| 1 | 0 | 0 | 0 | Clogging of carrier in carrier storage portion (above SOL1) |
| 1 | 0 | 1 | 1 | Clogging of carrier near SOL2 in the vertical tubular portion |
| 1 | 1 | 1 | 0 | Leakage of carrier in SOL1 portion |
| 1 | 1 | 1 | 1 | Leakage in SOL1 portion and clogging of SOL2 portion or abnormality of S2 |
| 0 | 1 | 1 | 1 | Abnormality of S2 |
| $t_0$ | $t_0$ | $t_2$ | $t_4$ | Status of carrier supply device / Detecting timings of sensors S1, S2 |
| S1 output | S2 output | | | |

In Table 1, sixteen combinations are originally possible, but the status of the carrier supply device is described for seven combinations excepting the combinations which cannot occur to the mechanical device. As is apparent from this Table, the detector means according to the present invention has self-diagnosing functions of the machine judging not only that the carrier has been supplied normally and that the hopper for carrier has become empty, but also that abnormality has occurred to the supply of the carrier and that abnormality has occurred to the sensor system. As a matter of course, it becomes possible to indicate the status in a status code in accordance with the respective states and thus, it becomes possible to indicate said status code to an indicator (not shown) and exactly inform the operator of the condition of the device.

The above-described embodiment has been shown as using two sensors, but it is apparent that only one sensor may be used to check up the feed condition of the carrier. Of course, the detection timing is not restricted to the present embodiment. For convenience of description, photosensors have been used as the sensors and the container for containing the carrier therein has been shown as being formed of a light-transmitting material, whereas the present invention is not restricted thereto but may also be carried out by using inductance type sensors responsive to a magnetic material or magnetic type sensors such as Hall IC. Also, said container may of course be formed of a material which is opaque but has no magnetism shielding property such as, for example, aluminum, brass, plastics or the like. As previously described, the present invention is also applicable to a magnetic toner supply device instead of the carrier supply device.

Figure 10:
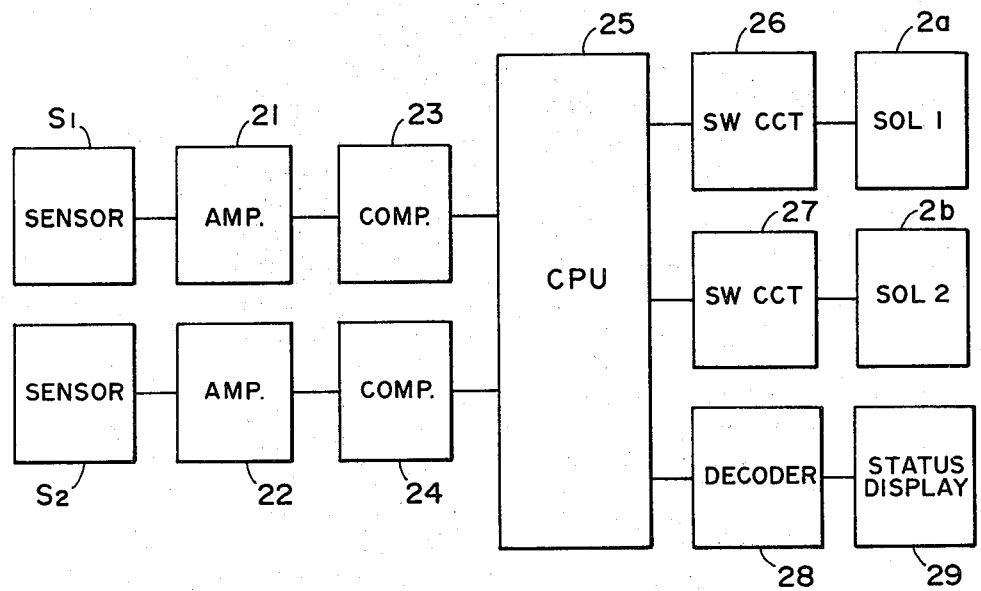
FIG. 10 is a block diagram of the control system.

FIG. 10 shows a block diagram of the control system. The outputs of the sensors S1 and S2 are amplified to necessary voltages by amplifier circuits 21 and 22, respectively, and are compared with a predetermined level of voltage by comparators 23 and 24 and thereby transformed into binary forms, which are applied as inputs to a central processing unit 25 (hereinafter simply referred to as CPU). In the CPU25, the outputs of the sensors S1 and S2 are examined at the timings shown in FIG. 9. On the other hand, the control signal for an actuator is applied, as energization signal, from the CPU to the solenoids SOL1 and SOL2 via switching circuits 26 and 27. The electromagnets E1 and E2 of FIGS. 1–3 may also be energized by these switching circuits. When abnormality has been found by examining the outputs of said sensors, a status code corresponding to the abnormal status is displayed on a display device 29 via a decoder 28.

Providing sensors for detecting carrier in the carrier supply device and checking up the outputs from the sensors at suitable timing as described above leads to the following advantages:

(i) It can be checked up whether the carrier has decreased below a predetermined level of the storage portion or has become exhausted;
(ii) It can be checked up whether or not the supply of carrier has been effected properly; and
(iii) The presence of abnormality in the sensors can be checked up.

As has been described above, according to the present invention, magnetic field producing means is provided near the container storing carrier or magnetic toner therein and the supply of the carrier or the magnetic toner is controlled by the magnetic field produced by the magnetic field producing means. Thus, the present invention can solve the problems peculiar to the conventional device by a simple construction and can accomplish the reliable control of the supply of carrier or magnetic toner to the developing means.

What I claim is:

1. A developer supply device for supplying a developing device with developer consisting of a mixture of toner and carrier, said developer supply device having:
    toner supply means for supplying toner;

carrier supply means having a supply port for supplying carrier;

magnetic field forming means provided near the carrier supply port of said carrier supply means and including an electromagnet and a permanent magnet disposed in opposed relation therewith; and means for controlling the intensity of a magnetic field imparted to the supply port of said carrier supply means by said magnetic field forming means, the intensity of the magnetic field being varied by said control means so that the passage of the carrier through said carrier supply port and prevention of said passage are selectively effected.

2. A device according to claim 1, wherein two of said magnetic field forming means are juxtaposed relative to said carrier supply means with a predetermined distance therebetween.

3. A device according to claim 1, wherein said permanent magnet is adjustable in its position with respect to said carrier supply port.

4. A device according to claim 1, wherein said carrier supply means is of a funnel shape.

5. A developer supply device for supplying a developing device with developer consisting of a mixture of toner and carrier, said developer supply device having:

toner supply means for supplying toner;

carrier supply means having a supply port for supplying carrier;

magnetic field forming means provided near the carrier supply port of said carrier supply means;

means for controlling the intensity of a magnetic field imparted to the supply port of said carrier supply means by said magnetic field forming means, the intensity of the magnetic field being varied by said control means so that the passage of the carrier through said carrier supply port and prevention of said passage are selectively effected; and detector means for detecting the presence of the carrier in said supply means.

6. A device according to claim 5, wherein two of said detector means are provided.

7. A device according to claim 6 or 5, wherein said detector means is optical detector means.

8. A device according to claim 2, further having two detector means for detecting the presence of the carrier and wherein one of said two detector means is disposed between said two magnetic field forming means.

9. A device according to claim 8 or 5, further having means for changing the sense timing of said detector means to effect confirmation of carrier supply.

10. A device according to claim 8 or 5, further having means for changing the sense timing of said detector means to effect the confirmation that said carrier supply means is empty.

11. A device according to claim 8, further having means for changing the sense timing of said dectector means to effect detection of abnormality of said detector means.

12. A device according to claim 6 or 5, further having a display device for displaying the result of said detector means.

13. A developer supply device for supplying developer to a developing device, having:

storage means formed with a supply portion for storing the developer therein;

magnetic field forming means provided near the supply portion of said developer storage means and including an electromagnet and a permanent magnet disposed in opposed relation therewith; and means for controlling the intensity of a magnetic field imparted to the developer supply portion by said magnetic field forming means, the intensity of the magnetic field being varied by said control means so that the passage and stagnation of the developer in the supply portion are controlled.

14. A device according to claim 13, wherein said developer consists of carrier alone.

15. A device according to claim 13, wherein said developer is a magnetic toner.

* * * * *

UNITED STATES PATENT AND TRADEMARK OFFICE
CERTIFICATE OF CORRECTION

PATENT NO. : 4,380,309

DATED : April 19, 1983

INVENTOR(S) : YUJI TAKAHASHI

It is certified that error appears in the above-identified patent and that said Letters Patent is hereby corrected as shown below:

Column 2, line 42, "becomes" should read --become--.

Column 3, line 17, "Wnen" should read --When--;
          line 26, "in" should read --is--.

Column 4, line 31, "time-controlling" should read --time-controlled--;
          line 49, "centrol" should read --central--;
          line 63, "be" should read --by--.

Column 5, line 56, "1,000.000" should read --1,000,000--.

Column 10, Claim 12, line 1, "6 or 5" should read --5 or 8--.

Signed and Sealed this

Twentieth Day of December 1983

[SEAL]

Attest:

GERALD J. MOSSINGHOFF

Attesting Officer    Commissioner of Patents and Trademarks